(12) United States Patent
Strobel et al.

(10) Patent No.: US 7,405,017 B2
(45) Date of Patent: Jul. 29, 2008

(54) BIPOLAR PLATE

(75) Inventors: Raimund Strobel, Ulm (DE); Kurt Hohe, Langenau (DE); Kai Lemke, Ulm (DE); Dieter Grafl, Ulm (DE); Dominique Tasch, Neu-Ulm (DE); Markus Lemm, Blaustein (DE)

(73) Assignee: REINZ-Dichtungs - GmbH, Neu-Ulm (DE)

( * ) Notice: Subject to any disclaimer, the term of this patent is extended or adjusted under 35 U.S.C. 154(b) by 187 days.

(21) Appl. No.: 10/502,039

(22) PCT Filed: Jan. 22, 2003

(86) PCT No.: PCT/EP03/00623

§ 371 (c)(1),
(2), (4) Date: Jan. 24, 2005

(87) PCT Pub. No.: WO03/063264

PCT Pub. Date: Jul. 31, 2003

(65) Prior Publication Data

US 2005/0118486 A1  Jun. 2, 2005

(30) Foreign Application Priority Data

Jan. 23, 2002  (DE) ................. 102 03 612

(51) Int. Cl.
*H01M 8/04* (2006.01)
*H01M 8/02* (2006.01)

(52) U.S. Cl. .............. 429/34; 429/38; 429/39

(58) Field of Classification Search .............. None
See application file for complete search history.

(56) References Cited

U.S. PATENT DOCUMENTS 6,869,719 B2 * 3/2005 Hatoh et al. ............ 429/35
2003/0235744 A1 * 12/2003 Pflaesterer ............ 429/35

FOREIGN PATENT DOCUMENTS

| DE | 43 09 976 A1 | 9/1994 |
| DE | 100 15 360 | 10/2001 |
| EP | 0 933 826 A1 | 8/1999 |
| EP | 1 320 142 | 6/2003 |
| FR | 2 810 795 | 12/2001 |
| FR | 2810795 | * 12/2001 |
| WO | WO-98/33221 | 7/1998 |

OTHER PUBLICATIONS

International Search Report (4 pages), Aug. 2004.

(Continued)

*Primary Examiner*—John S Maples
(74) *Attorney, Agent, or Firm*—Marshall & Melhorn, LLC

(57) ABSTRACT

The present invention relates to bipolar plate (1) as well as to a fuel cell assembly (2). The bipolar plate comprises two outer surfaces (3a, 3b) which are electrically connected to one another, for the electrical contacting, as well as the discharge and supply of gases and/or fluids to the surfaces of the fuel cells which are adjacent to the outer surfaces. The bipolar plate comprises a frame (7) open in the central region as well as an inner part (3) arranged in the central reign, wherein the frame and the inner part are elastically connected to one another.

12 Claims, 5 Drawing Sheets

OTHER PUBLICATIONS

Figure 1A:
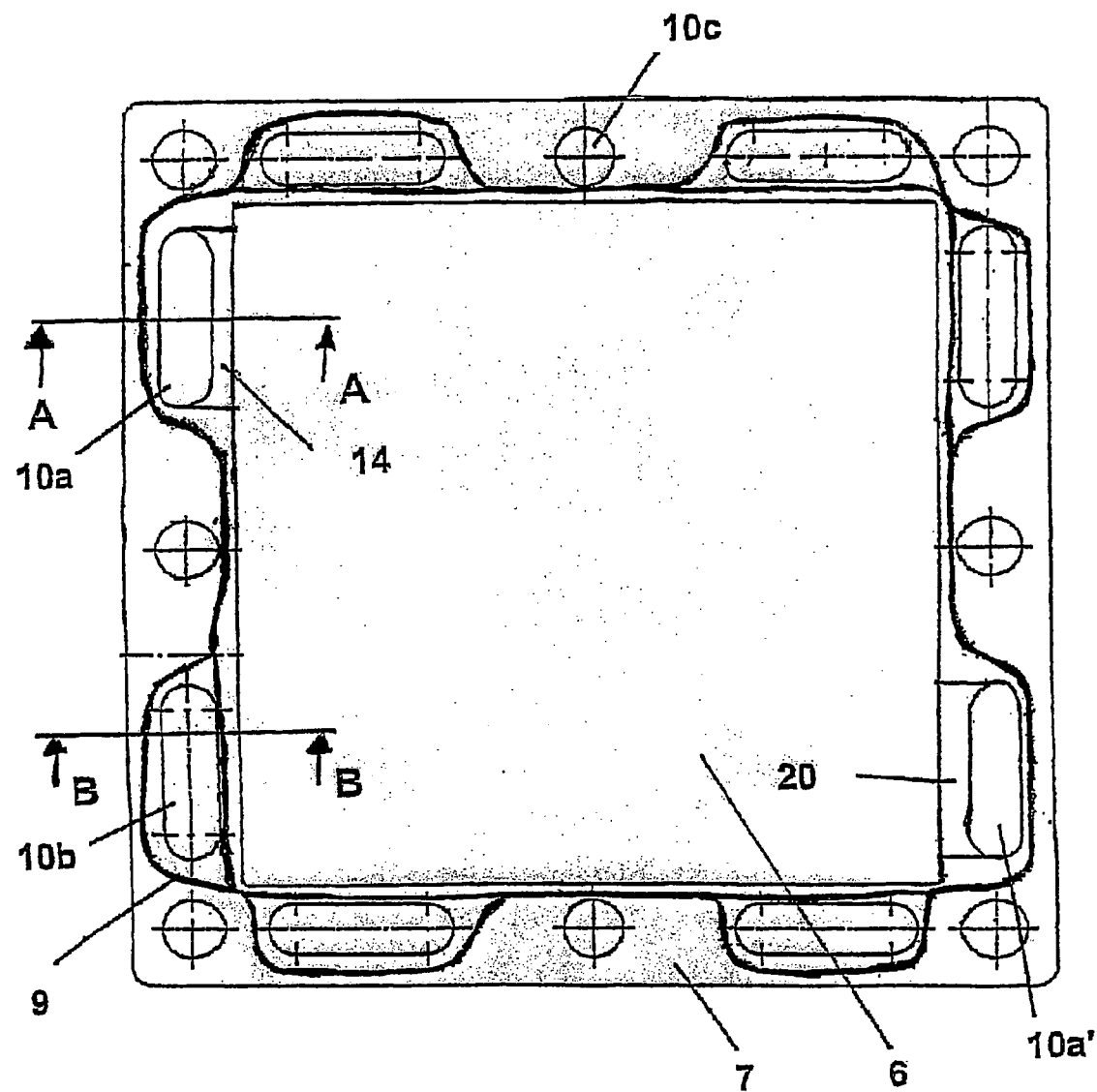

Derwent English Abstract for FR 2 810 795, 2002, (no month).
Delphion English Abstract for EP 1 320 142, Jul. 2004.
Derwent English Abstract for DE 100 15 360 - 2001 - no month.
Delphion English Abstract for EP0620609B1 (which is a family member of DE 43 09 976 A1) (2 pages), Nov. 2004.

* cited by examiner (Schnitt A-A)

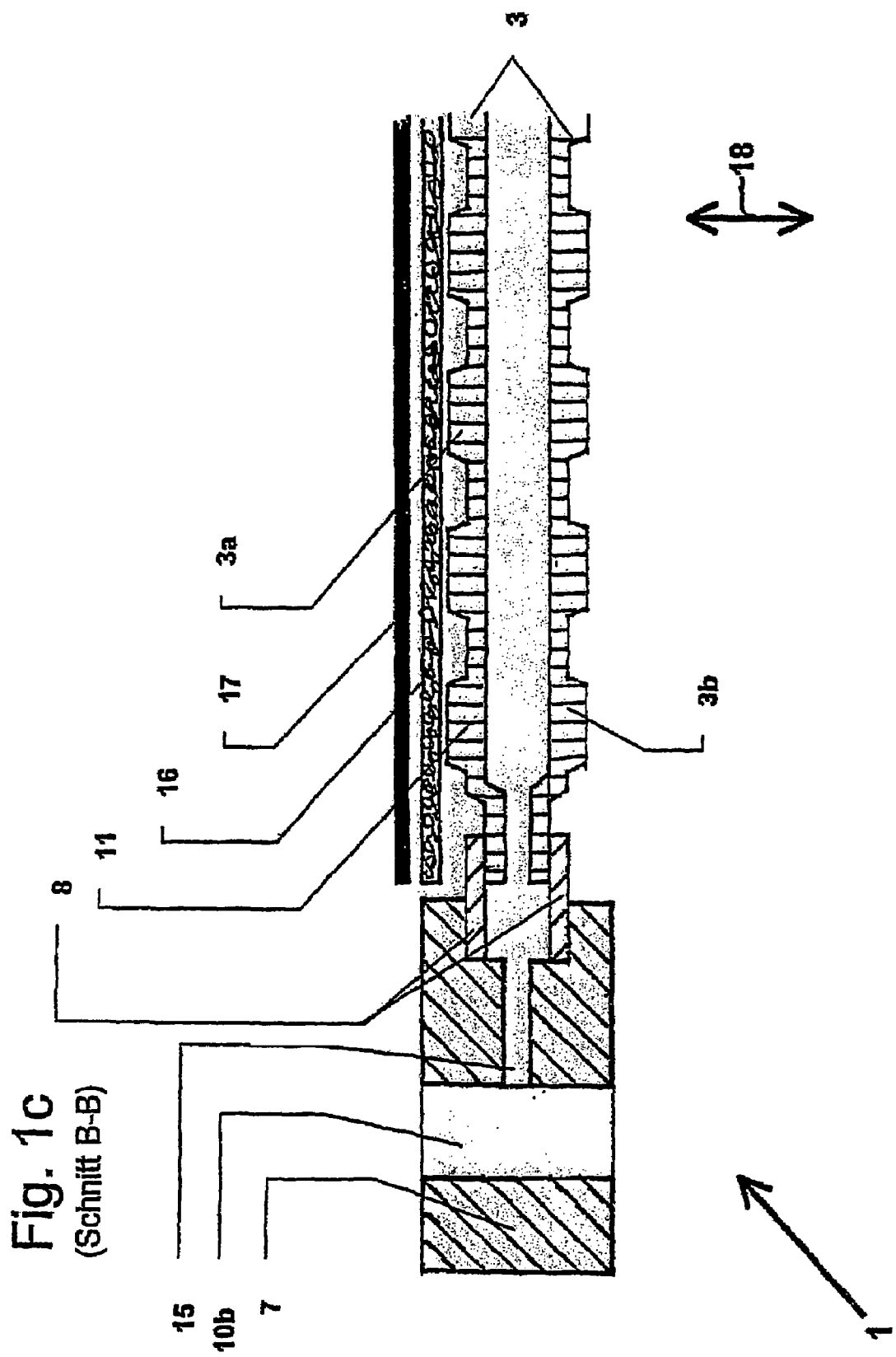

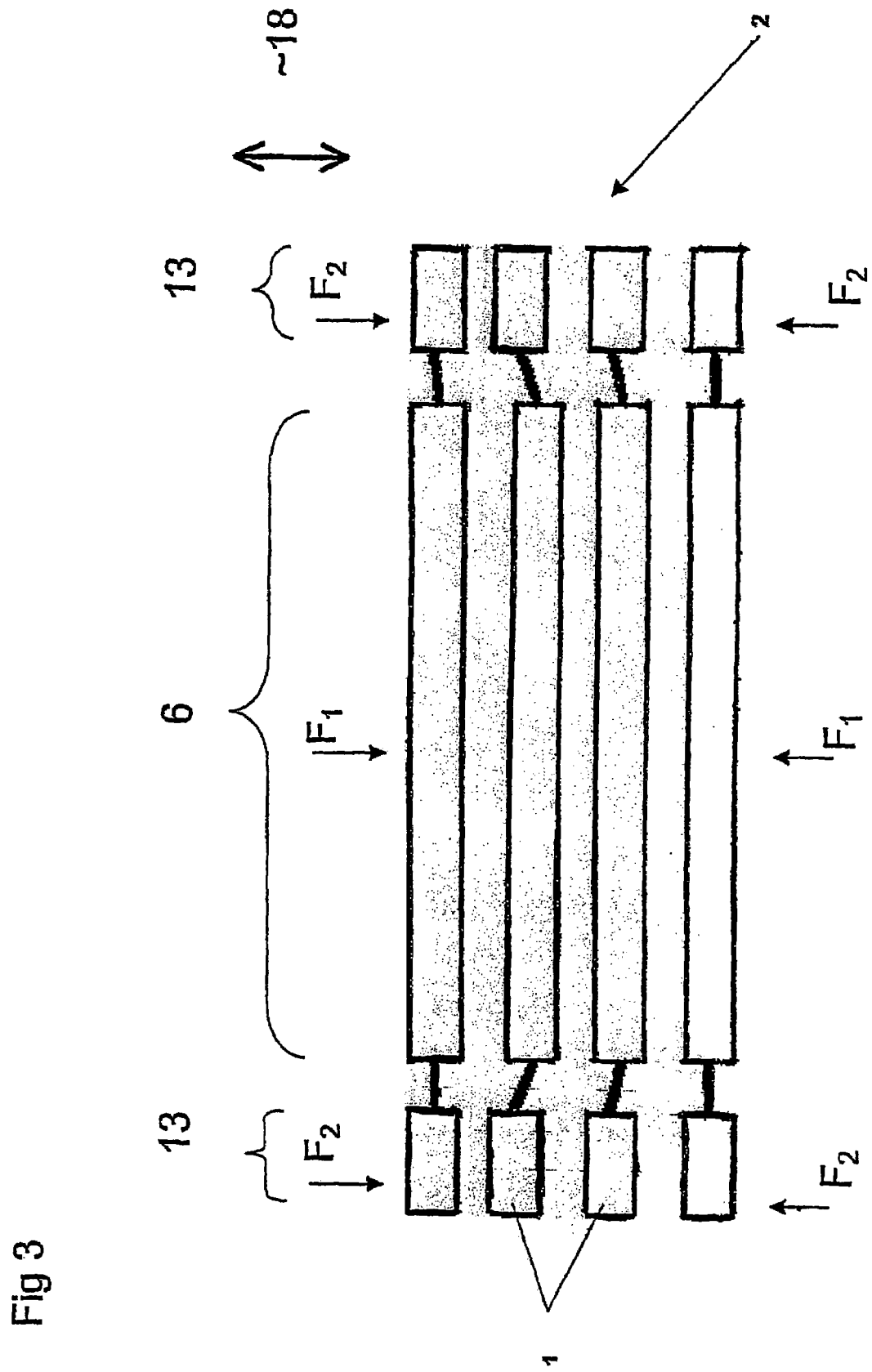

BIPOLAR PLATE

The present invention relates to a fuel cell stack and to a bipolar plate for a fuel cell stack.

With PEM fuel cells (polymer electrolyte membrane fuel, cells), usually several fuel cells are layered on one another into a fuel cell stack. Bipolar plates which effect the separation between the individual cells assume the following functions:

- electrically contacting the electrodes of the fuel cells and leading the current to the adjacent cell (series connection of the cells),
- supplying the cells with reaction gases and transporting away the produced water via a suitable channel structure,
- leading the waste heat arising with the reaction in the fuel cells as well as
- mutually sealing the various gas and cooling chambers, and sealing them to the outside.

It is known to manufacture bipolar cells of graphite materials of essentially one piece. The advantage of graphite materials leads in its high corrosion resistance and, with regard to mobile applications, in its low material density. However the vulnerability with tensile stresses and the brittleness of the graphite materials which this entails however greatly restricts the selection of the shaping/forming method for the structuring. The shaping/forming with material removal is not an option when considering economical mass production.

As an alternative it has also been attempted to manufacture metallic bipolar plates of metal such as stainless steel and titanium. With this however, there exists the disadvantages with regard to corrosion as well as to the costs. The manufacture of complicated channel structures with metallic plates demands very complicate shaping/forming methods, which renders the construction of bipolar plates significantly more expensive.

Independently of the applied material, a further demand on the bipolar plate is that this may only have very small tolerances with regard to its dimensioning. This on the one hand is due to the fact that the sealedness must be achieved in the regions of through-flow openings for gases or fluids which flow through the bipolar plate and connect to other components. It is furthermore necessary to exert a uniform pressing pressure onto electrodes of adjacent fuel cells via the bipolar plates, in order thus to permit a uniform, large-surfaced supply of media and furthermore a flow of current which is uniformly distributed over the area.

Proceeding from this, it is the object of the present invention to provide a bipolar plate for fuel cell stacks which on the one hand may be manufactured in an economical manner and on the other hand despite this, fulfils the highest of demands with regard to the sealing and a uniform pressing pressure.

This object is achieved by a bipolar plate according to the present invention, and these advantages are exploited with a fuel cell stack according to the present invention.

This object is achieved by way of the fact that a bipolar plate according to the invention comprises a frame which is open in its middle central region, and an inner part is arranged in this central region, wherein the frame and the inner part are elastically coupled to one another.

With the at least two-part arrangement of the bipolar plate (thus frame and inner part) it is rendered possible for the first time to only have to use expensive material where it is indeed required. An adapted selection of material may take place. Thus e.g. in the frame region which is provided with through-flow openings for corrosive media, one may fall back on inexpensive corrosion-resistant plastics. Metals or graphite materials may be used in the region of the inner part where it is a question of an electrically conducting surface.

With this, it is particularly favourable for the frame and the inner part to be elastically coupled to one another. By way of this, completely different tolerance demands are made in contrast to one-part bipolar plates. Thus the elastic coupling of the frame and the inner part on the one hand permit the frame and, on the other hand, the inner parts of adjacent bipolar plates, to be braced (loaded) to one another. Thus it is no longer necessary to fulfil strict tolerances over the whole area of the bipolar plate since this relation of the frame and inner part are de facto decoupled from one another. Furthermore this is very significant with regard to the practicability a life duration of a fuel cell stack, since settling effects of seals or gas diffusion layers arranged in the central region are likewise compensated in a manner decoupled from one another so that settling effects in one region may not have a negative effect on another region of the fuel plate.

The fuel cell stack according to the invention makes use of the bipolar plates according to the invention inasmuch as means are provided for the axial compression of the fuel cell stack separately for the central region and the region of the frame, i.e. that these means press the central region and the frame region axially onto one another in each case in an isolated manner.

Advantageous embodiments of the present invention are specified in the dependent claims.

A particularly advantageous embodiment envisages the inner part and the frame being connected by an elastic element belonging to the bipolar plate and thus being elastically coupled to one another. This permits an essentially rigid inner part and a rigid frame to still be able to be elastically displaceable to one another. At the same time, the elastic element may be designed as an elastomer peripheral (injection) moulding in the border region of the frame and the inner part. It is also possible for the elastic element to be glued (bonded) to the inner part or the frame or for it to be connected to the inner part and/or frame with a positive fit. Here, all arrangements are conceivable, it is however important on the one hand for an elastic coupling of the frame and inner part to be given and on the other hand for a fluid-tight and gas-tight isolation to be ensured, i.e. that no fluids or gases are able to enter the border region between the inner part and the frame. The passage of gas or fluid transversely to the bipolar plate should only be effected through the passage openings which are provided for this.

A further particularly advantageous embodiment envisages the frame to comprise passage openings for gases, fluids or fastening means (such as clamping bolts). The region around these passage openings may at the same time be sealed by way of special seals. Here, apart from inserted finished seals one also particularly considers seals which deposited or (injection) moulded in or on by way of the screen-printing method. Part of the seals may be partly relieved in order thus to permit a flow of media from the passage openings towards the central region. This e.g. is necessary in order to supply a surface of an inner part with a supple medium such as molecular hydrogen or in order permit reaction water to be transported away.

One may however also envisage the inner part to comprise a hollow inner space to be able to be connected to a passage opening of the frame. In this manner, a coolant may be introduced into the inner space of the inner part so that a particularly effective cooling; and thus a direct temperature [closed-loop] control is rendered possible in the inside of the fuel cell stack. With all channels which are provided from the passage openings to the inner part, one must however take care that the elastic element at the same time in some events is to be bridged without compromising its sealing effect.

A particularly advantageous embodiment envisages the frames being of plastic. This permits a particularly economical manufacture of the frame. Practically no corrosion problems occur. In particular, a complicated geometry of passage openings is simple to create with the injection moulding method. Moreover, one requires no expensive measures for the electrical insulation.

It is however also possible to manufacture the frame of an elastomer material. In this case no separate elastic element is required. An intrinsic elasticity of the frame is thus sufficient for the elastic play between the inner part and the remaining frame. By way of this, in some circumstances one may also make do without additional sealing in the region of the passage openings.

With regard to the inner part, one may also fall back on the properties of suitable materials. Thus it is particularly advantageous to provide these inner parts of corrosion-resistant metals, graphite or graphite composites. Expensive shaping/forming manufacturing methods at the same time are not required. Despite this, in particular with metallic materials, it is possible to emboss a flowfield having a large-surfaced gas distribution, on an outer surface of the inner part.

Further advantageous formations of the present invention are described in the remaining dependent claims.

Figure 1B:
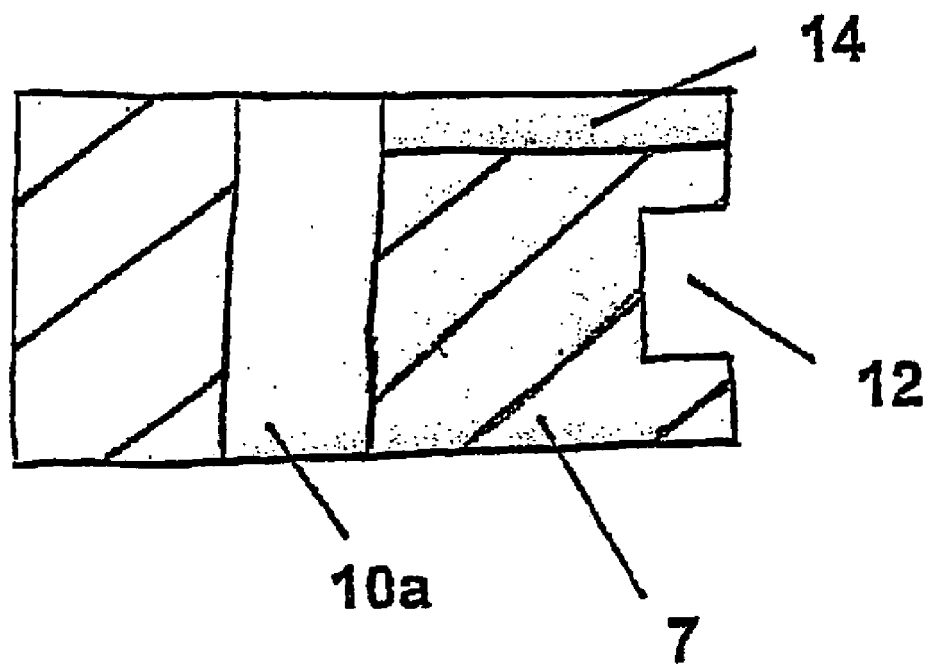
Figure 2A:
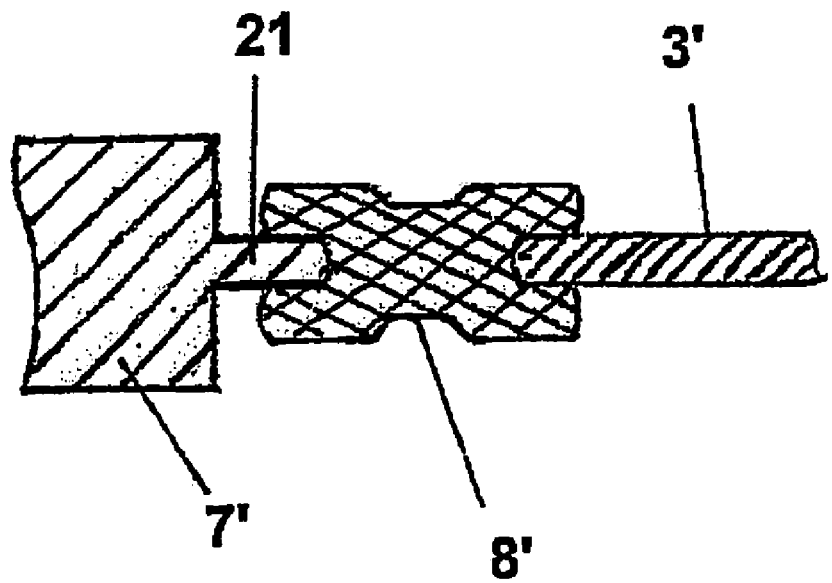
Figure 2B:
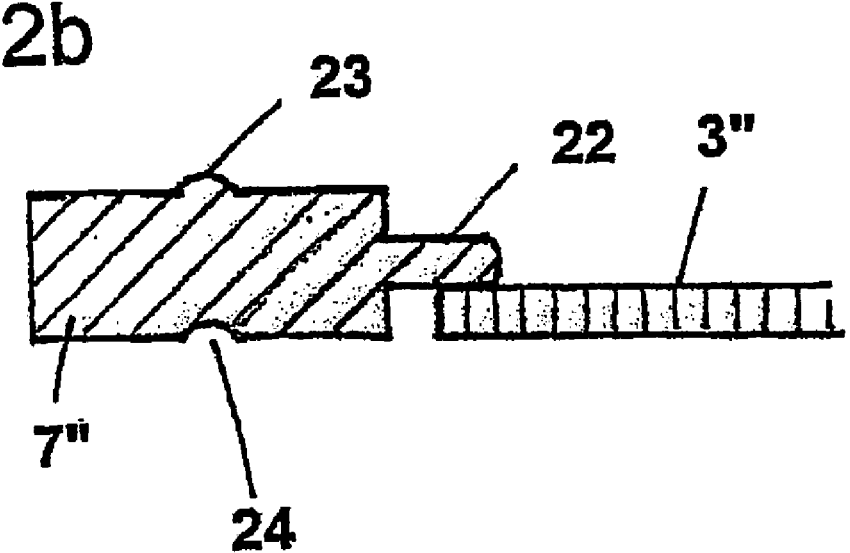

The present invention is now described by way of several figures. There are shown in:

FIG. 1a a frame according to the invention, of a bipolar plate, in a plan view,

FIG. 1b a section according to A-A through the frame according to the invention, according to FIG. 1a, FIG. 1c a section according to B-B through the frame according to FIG. 1a with an inserted elastic element and an inner part, FIGS. 2a and 2b detail sections of further embodiment forms of the frame according to the invention, as well as FIG. 3 a schematic representation of a fuel cell stack according to the invention.

FIG. 1a shows a view from the top of the frame of a bipolar plate according to the invention. The frame 7 is open in the central region 6 which is essentially arranged in the middle. An inner part which is not shown in FIG. 1a may be arranged in the central region or may cover this. This inner part and the frame 7 are then elastically coupled to one another.

The frame comprises passage holes 10a, 10b as well as 10c. The passage holes 10c are suitable for leading through clamping bolts for example. With this then an axial pressing pressure is exerted in the axial direction perpendicular to the plane of the sheet in FIG. 1a onto bipolar plates or onto a fuel cell stack containing these bipolar plates. Further passage holes are also provided. The passage holes 10a serve for the supply of molecular hydrogen from the passage holes to an outer surface of an inner part which is to be accommodated in the central region. Further details will be discussed in the description of the section A-A in FIG. 1b.

Passage openings 10b for cooling fluid are further provided. More specific details will be discussed with regard to FIG. 1c which shows the section B-B.

A seal 9 surrounds all passage holes which conduct fluid or gaseous media. This serves for sealing the passage holes when the bipolar plate is pressed onto adjacent components. The seal 9 is deposited onto the frame with the screen-printing method. The sealing effect of the seal 9 sets in when the frame 7 of the bipolar plate is axially pressed in the direction perpendicular to the plane of the sheet and thus a pressure is exerted onto the seals 9 for seating the passage holes. The frame in FIG. 1a is a plastic injection moulded part. This has the advantage that the passage openings as well as possible channels from the passage openings towards the central region are able to be manufactured with the injection moulding method. Of course it is also possible to manufacture the of frame 7 of other materials, such as metals or graphite materials.

FIG. 1b shows a section through the frame 7 according to A-A. The representation of the seal 9 has been omitted in the section. A passage opening 10a is shown which may bring molecular hydrogen through a supply channel 14 to a flowfield on the outer side of the inner part (for this, see FIG. 1c). A bordering (enclosure) 12 is also shown in FIG. 1b, into which an inner part for covering the central region 6, or an elastic element which elastically holds this inner part may be incorporated.

FIG. 1c shows a section according to B-B through the frame of FIG. 1a. For an improved illustration, in this section yet further elements of a bipolar plate according to the invention arranged in the central region are shown. A passage opening 10b for leading through cooling fluid is shown in FIG. 1c. The passage opening 10b is connected to a cooling channel 15 which is open towards the central region of the frame 7. An elastic element 8 is incorporated in the peripheral bordering (enclosure) 12 and this element peripherally carries an inner part 3 elastically within the frame 7. The elastic inner part comprises two outer surfaces 3a as well as 3b. The outer surface 3a to the top has an embossed flowfield 11 for the large-surfaced distribution of hydrogen on the outer surface 3a. The lower outer surface 3b likewise comprises a flowfield. The outer surfaces 3a and 3b are each electrically conducting and are electrically connected to one another. In the present case they are of metal (e.g. titanium). It is however also possible to manufacture these of other metals or also of graphite or a graphite composite. An electrically conductive plastic is also conceivable. A gas diffusion layer of a carbon fleece is applied on the flowfield of the outer surface 3a in FIG. 1c. An ion-conductive polymer electrolyte membrane 17 of a fuel cell is then applied above this gas diffusion layer.

The function of the bipolar plate is explained in more detail in the following. Since this serves for mutually delimiting a cathode side as well as an anode side of the fuel cells in a gas-tight and fluid-tight manner, no medium may be led through the bipolar plate 1 in the axial direction 18 (except through the passage openings envisaged for this). For this, the elastic element 8 consisting of an elastomer is rigidly connected to the frame 7 as well as the inner part 3 in a gas-tight manner, such as by way of gluing (bonding). The inner part 3 in the inside is hollow so that cooling fluid supplied through the passage hole 10b may penetrate through the cooling channel 15 into the inner space 19 of the inner part. A precise temperature management for the fuel cell stack is possible on account of this very direct manner of cooling.

The supply of the flowfield of the outer surface 3a is effected via the arrangement, shown in FIG. 1b, of the passage opening 10a as well as the supply channel 14 which connects to this and which is open to the flowfield of the outer surface 3a. By way of the embossing of the flowfield, a large-surfaced distribution of the supplied reaction gas occurs on the flowfield, and the fine diffusion towards the membrane is achieved by way of the gas diffusion layer. The leading-away of excess reaction gas is effected through the diagonally distanced arrangement around the passage opening 10a', which is to be seen in FIG. 1a and which has a discharge channel 20 corresponding in geometry to the supply channel 14.

The bipolar plate is then constructed such that one may apply an axial pressing force in the direction 18 separately for the region of the frame 7 as well as for the central region 6 (thus everything which lies within the frame 7). With this, the pressure on the frame 7 in the direction 18 primarily serves for pressing the seals 9 surrounding the passage openings 10a and 10b so than no leakage occurs in the region of the sealing openings. A bracing (loading) for the central region serves for achieving a uniform contact or a uniform pressing pressure of the membrane as well as the gas diffusion layer onto the flowfield. By way of this a uniform gas distribution over the flowfield and thus towards the membrane as well as a homogeneous current distribution is made possible. This then effects good efficiencies of the fuel cell stack according to the invention. At the same time it is of particular interest that a readjustment (resetting) is possible in an independent manner should settling effects of the seal 9 or e.g. the gas diffusion layer 16 in permanent operation of the fuel cell stack occur.

The mechanical decoupling of the inner part 3 as well as the frame 7 which is required for this is achieved by the elastic element 8, which permits a movement of the inner part 3 with respect to the frame 7 within certain limits. The elastic element which covers the region between the frame 7 and the inner part 3 in an elastic and sealing manner may at the same time be glued (bonded) to these two parts or may be connected to these with a positive fit.

FIG. 2a shows a further embodiment form of a bipolar plate according to the invention. With this, an essentially flat inner part 3' is provided, which is not hollow in its inside. The frame 7' peripherally comprises a protruding arm 21. This arm 21 as well as the outer edging of the inner part 3' are peripherally [injection] molded with an elastomer 8" which, as is shown in FIG. 2a, is essentially bone-like in cross section.

FIG. 2b shows a further variant of a bipolar plate according to the invention. For this, the frame 7" is of an elastomer material. This frame 7" on its side which is proximal to the central region peripherally comprises an arm 22 which is bonded (glued) to the outer edge of an inner part 3". The frame 7" at the same time has such a high intrinsic elasticity that the elastic play between the inner part and the frame is effected alone by this intrinsic elasticity. No additional elastic element is required for interconnection between the frame 7" and the inner part 3". The frame 7" furthermore on its upper side comprises a hill-like and peripheral lip 23 which engages into a corresponding recess of an adjacent component (this recess corresponds e.g. to the recess 24) and thus displays a sealing effect.

FIG. 3 once again in a concluding manner schematically shows the force conditions in a fuel cell stack according to the invention. At the same time the central region 6 as well as the region of the frame 13 may be braced (loaded) axially in the direction 18 separate from one another. A force F2 may be exerted by way of clamping bolts or clamping strips onto end plates of a fuel cell stack so that an axial loading is exerted onto the frame of the bipolar plates 1. Independently of this, a force F1 may be exerted onto the central region 6 of the bipolar plates 1. This is made possible by way of clamping strips or a screw clamp type pressing arrangement, without the bipolar plates 1 having to be perforated in the axial direction 18 for this.

In the present invention it is essential that (e.g. with respect to FIG. 3) the central region 6 as well as the frame region 13 are (completely) mechanically decoupled from one another. This means that the decoupling path is only limited by the elasticity range of the elastic member lying therebetween and is not additionally restricted in the freedom of movement by a flange-like, clamping design.

Thus it becomes possible without further ado for the decoupling path (i.e. the maximal displacement in the region 18 according to FIG. 3) to also amount to more than 50% of the greatest extension of the elastomer material in the direction 18 (this e.g. is quite evident in FIG. 2a as the maximal height of the element 8').

In particular in FIG. 3 it may also be easily recognised than no mechanical "abutment" exists between the frame region 13 as well as the central region 6. The ability to be displaced is ensured alone by the elastic element arranged between these regions. This manifests itself in the fact that in the projection direction 18 no overlapping exist between the frame region 13 and the central region 6 in the plane of the plate, i.e. perpendicular to the direction vector 18. Instead, the frame region 12 encloses the central region 6 without overlapping occurring here.

This relation may also be easily recognised in FIG. 1c. Here it is evident that the frame 7 and well as the bipolar plate 3 have no overlapping in the plane of the plate (i.e. perpendicular to the direction vector 18) so that a displaceability of the bipolar plate 3 with respect to the frame 7 in the direction 18 which is limited only by the elastic element 8 is possible. This relation may also be easily recognised with the embodiments according to FIG. 2a as well as FIG. 2b.

Concluding a fuel cell assembly is a shown which in an axial layering contains bipolar plates between individual fuel cells and is characterised in that the bipolar plates comprise a frame 7 which is open in the central region 6, as well as an inner part 3 arranged in the central region, wherein the frame and the inner part are elastically coupled to one another and the fuel cell assembly envisages separate means for the axial compression of the fuel cell assembly for the central region 6 and the region 13 of the frame.

Above all, a bipolar plate 1 for use in such above mentioned fuel cell assemblies is shown, which comprises two surfaces 3a, 3b which are electrically connected to one another for the electrical contacting, as well as for the supply and discharge of gases and/or fluid to surfaces 5 of the fuel cells, said surfaces being adjacent to the outer surfaces, wherein the bipolar plate comprises a frame 7 open in the central region 6 as well as an inner part 3 arranged in the central region, wherein the frame and the inner part are elastically coupled to one another. This elastic decoupling is preferably characterised in that no overlapping of the frame 7 and the inner part 3 arranged therein are given in the plate plane of the bipolar plate so that a perfect mechanical decoupling from the central region and the frame region is given.

The fuel cell stack according to the invention for the central region 6 and the region 13 of the frame may comprise separate means for the axial compression of the fuel cell stack and/or means for the separate axial compression of the fuel cell stack.

For this, e.g. clamping bolts, clamping strips, clamping yokes or also hydraulic compression means may be provided for the separate compression of the central region and region of the frame. Furthermore, it is also possible to provide other means for the separate axial compression of the fuel cell stack. These may e.g. be non-plane ("topographic") end plates of the fuel cell stack or non-plane bipolar plates. Here, in each case by way of a differing height or topography of these usually plane plates, one achieves a different bracing (loading) of the central region and the frame and region of the frame.

The invention claimed is:

1. A bipolar plate for fuel cell stacks which comprises two outer surfaces electrically connected to one another, for the electrical contacting as well as for the discharge and supply of gases and/or fluids to surfaces of fuel cells, said surfaces being adjacent to the outer surfaces, characterized in that the bipolar plate comprises a frame which is open in a central region as well as an inner pad arranged in the central region, wherein the frame and the inner part are elastically coupled to one another utilizing an elastomer.

2. A bipolar plate according to claim 1, characterized in that the inner part and the frame are connected by an elastic element.

3. A bipolar plate according to claim 2, characterized in that the elastic element is designed as an elastomer peripheral moulding of the frame and/or inner part.

4. A bipolar plate according to claim 2, characterized in that the elastic element is bonded to the inner pad and/or to the frame or is connected to the inner pad and/or frame with a positive fit.

5. A bipolar plate according to claim 1, characterized in that the frame is provided with seals for a fluid-tight closure to adjacent components.

6. A bipolar plate according to claim 1, characterized in that the frame comprises passage openings for gasses and/or fluids, as well as fastening means.

7. A bipolar plate according to claim 6, characterized in that the passage openings of the frame are open towards the central region.

8. A bipolar plate according to claim 6, characterized in that the inner part comprises a hollow inner space and this may be connected to at least one passage opening of the frame.

9. A bipolar plate according to claim 1, characterized in that the frame material is selected from the group consisting of plastic and elastomer.

10. A bipolar plate according to claim 9, characterized in that the inner part is of metal, graphite or graphite composite or is coated with a metal layer or consists of a conductive plastic.

11. A bipolar plate according to claim 9, characterized in that the inner part comprises an embossed flowfield for a large-surfaced gas distribution, on an outer surface of the inner part.

12. A bipolar plate according to claim 2, characterized in that the frame toward the central region peripherally comprises a bordering for holding the inner part or the elastic element.

* * * * *